W. ROWAN.
Car-Axle Box.
No. 4,226. Patented Oct. 9, 1845.
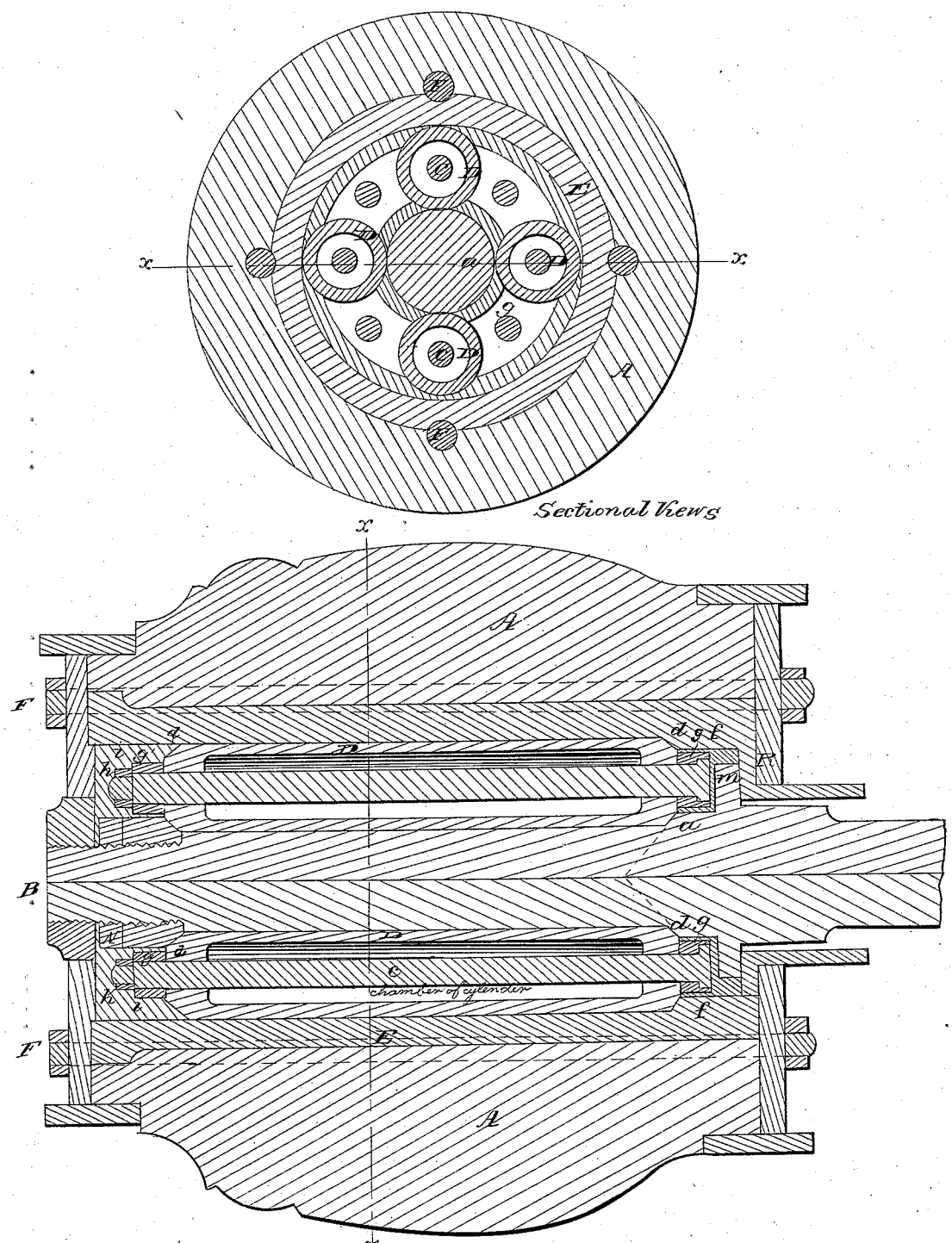

UNITED STATES PATENT OFFICE.

WILLIAM ROWAN, OF BELFAST, GREAT BRITAIN, ASSIGNOR TO THOMAS MURRAY MEGGOT, OF NEW ORLEANS, LOUISIANA.

ANTIFRICTION-BOX FOR AXLES, &c.

Specification of Letters Patent No. 4,226, dated October 9, 1845.

*To all whom it may concern:*

Be it known that I, WM. ROWAN, of the firm of Rowan & Sons, of Belfast, in the county of Antrim, in that part of the United Kingdom of Great Britain called "Ireland," have invented a new and useful Improvement on Axles and Antifriction-Rollers of the Boxes of Railroad - Cars and for other Purposes, and that the following is a full, clear, and exact description of the principle or character which distinguishes it from all other things before known and of the manner of constructing and using the same, reference being had to the accompanying drawings, making part of this specification, in which—

Figure 1 is a longitudinal section taken through the box and axle, and Fig. 2, a transverse section taken at the line (X X) of Fig. 1.

The nature of my invention consists in providing the axle and box with beveled or mitered shoulders or collars in connection with anti-friction rollers, having the ends of corresponding form to substitute rolling for rubbing friction at the ends of the rollers; as it is well known that in the use of anti-friction rollers in the boxes of carriage and other axles, much friction in guiding the rollers, when made square or round, as heretofore, has been unavoidable; but, by this arrangement, rubbing friction is entirely avoided and rolling friction substituted therefor, and hence much jar may be avoided by keeping the flanches close up to the ends of the rollers.

The axle (*a*) is made cylindrical along that part of it on which the rollers (D D) revolve, and is provided with a shoulder or collar (*a'*) at the inner end, the face of which is inclined so as to form a miter with the ends of the rollers (D D), and the outer end is adapted to receive a nut (N), the inner face of which is beveled or mitered the reverse of the shoulder (*a'*), so that by turning this nut the distance between these two shoulders can be regulated at pleasure to suit the exact length of the rollers, and may be provided with a thumb screw or a key to secure it in place.

The rollers (D D) are cylindrical and the ends (*d d*) beveled or mitered to correspond with the shoulders on the axle. They are usually made hollow, with the apertures at each end smaller to receive, and turn on a cylindrical pin (*c*) secured at one end by a head, to a ring (*g*), and at the other, by a nut (*h*) to a corresponding ring (*g'*), so that by means of these rings all the rollers in the series are kept at proper distances apart while they are free to turn on their axes while revolving around the axle (*a*).

The inner periphery of the box or hub (A), is made cylindrical and of a diameter to embrace the whole series of rollers. At the inner end, it is provided with a shoulder or collar (*f*) the face of which is beveled to correspond with the end of the rollers, in manner similar to the shoulder on the axle, and the outer end is provided with a ring (*i*), with the inner face also beveled, and so adapted to the box by a screw or slide as to adjust the distance between its beveled face and the shoulder or collar (*f*). Or, instead of making this ring separate from the box, it may be a part of the box, which in that case should be made in two parts, and connected together by screwing one part on to the other, in manner well known to mechanicians. For the hubs of carriages the axle may be provided with a flanch (*m*) embraced by another flanch (R) attached to the hub by screw bolts (F), or otherwise, to prevent dust &c. from entering the box; and the hub may also be provided with a front plate (B). By thus beveling the ends of the rollers and the shoulders on the axle and box, it will be obvious that where the bodies come together in avoiding end play, the rubbing friction heretofore experienced, is avoided and rolling friction substituted therefor.

I do not claim as my invention the employment of a series of rollers connected by rings at each end around an axle and within a box, as this has long since been done; but What I do claim as my invention and desire to secure by Letters-Patent, is—

Making the ends of such rollers on a bevel or miter in combination with shoulders, collars, flanches, rings or other projections on the axle, and on the box or hub, having corresponding bevels or miters, to avoid the rubbing friction at the ends of the rollers, and the more effectually to prevent end play, substantially as herein described.

WILLM. ROWAN.

Witnesses:
GEORGE BONNER,
KATE CULTON.